(12) United States Patent
Hung et al.

(10) Patent No.: US 9,096,810 B2
(45) Date of Patent: Aug. 4, 2015

(54) METHOD FOR PRODUCING A BIO-COAL

(71) Applicant: CHINA STEEL CORPORATION, Kaohsiung (TW)

(72) Inventors: Ming-Tsai Hung, Kaohsiung (TW);
Chao-Wen Chen, Kaohsiung (TW);
Der-Her Wang, Kaohsiung (TW);
Hsiao-Kwang Lee, Kaohsiung (TW);
Jung-Tung Yang, Tainan (TW);
Yung-Ping Chu, Kaohsiung (TW);
Huang-Chih Cheng, Kaohsiung (TW)

(73) Assignee: China Steel Corporation, Kaohsiung (TW)

( * ) Notice: Subject to any disclaimer, the term of this patent is extended or adjusted under 35 U.S.C. 154(b) by 201 days.

(21) Appl. No.: 13/748,089

(22) Filed: Jan. 23, 2013

(65) Prior Publication Data

US 2013/0199086 A1  Aug. 8, 2013

(30) Foreign Application Priority Data

Feb. 3, 2012 (TW) .............................. 101103589 A

(51) Int. Cl.
| | |
|---|---|
| *C10L 11/00* | (2006.01) |
| *C10L 5/40* | (2006.01) |
| *C10L 5/08* | (2006.01) |
| *C10L 9/08* | (2006.01) |
| *C10L 5/36* | (2006.01) |
| *C10L 5/44* | (2006.01) |

(52) U.S. Cl.
CPC . *C10L 5/08* (2013.01); *C10L 5/363* (2013.01); *C10L 5/447* (2013.01); *C10L 9/083* (2013.01); *C10L 5/445* (2013.01); *C10L 2250/06* (2013.01); *C10L 2290/08* (2013.01); *C10L 2290/28* (2013.01); *C10L 2290/30* (2013.01); *Y02E 50/10* (2013.01); *Y02E 50/15* (2013.01); *Y02E 50/30* (2013.01)

(58) Field of Classification Search
CPC ............ C10L 2250/06; C10L 2290/08; C10L 2290/28; C10L 2290/30; C10L 5/08; C10L 5/252; C10L 5/445; C10L 5/447; C10L 9/083; C10B 49/10; C10B 53/02; Y02E 50/10; Y02E 50/15; Y02E 50/30
USPC .......................................... 44/388, 535, 589
See application file for complete search history.

(56) References Cited

U.S. PATENT DOCUMENTS

| | | | |
|---|---|---|---|
| 2010/0146850 A1* | 6/2010 | Bexell .............................. | 44/589 |
| 2011/0252696 A1* | 10/2011 | Franklin et al. .................. | 44/388 |
| 2011/0297885 A1* | 12/2011 | Boerrigter et al. ............ | 252/373 |

FOREIGN PATENT DOCUMENTS

| | | | |
|---|---|---|---|
| EP | 1990399 A1 | * | 11/2008 |
| WO | WO 2008036605 A2 | * | 3/2008 |
| WO | WO 2009005363 A1 | * | 1/2009 |
| WO | WO 2012023479 A1 | * | 2/2012 |

* cited by examiner

*Primary Examiner* — James Goloboy
*Assistant Examiner* — Latosha Hines
(74) *Attorney, Agent, or Firm* — Cesari and McKenna, LLP

(57) ABSTRACT

A method for producing a bio-coal includes the following steps:

(a) lowering the moisture content of a fiber residue obtained after oil extraction of oil palm fruit to less than 25%;
(b) after step (a), cutting the fiber residue;
(c) after step (b), pelletizing the fiber residue into short-fiber pellets;
(d) drying the short-fiber pellets to reduce the moisture content of the short-fiber pellets to below 10%; and
(e) after step (d), carbonizing the short-fiber pellets at a temperature below 300° C.

5 Claims, 1 Drawing Sheet

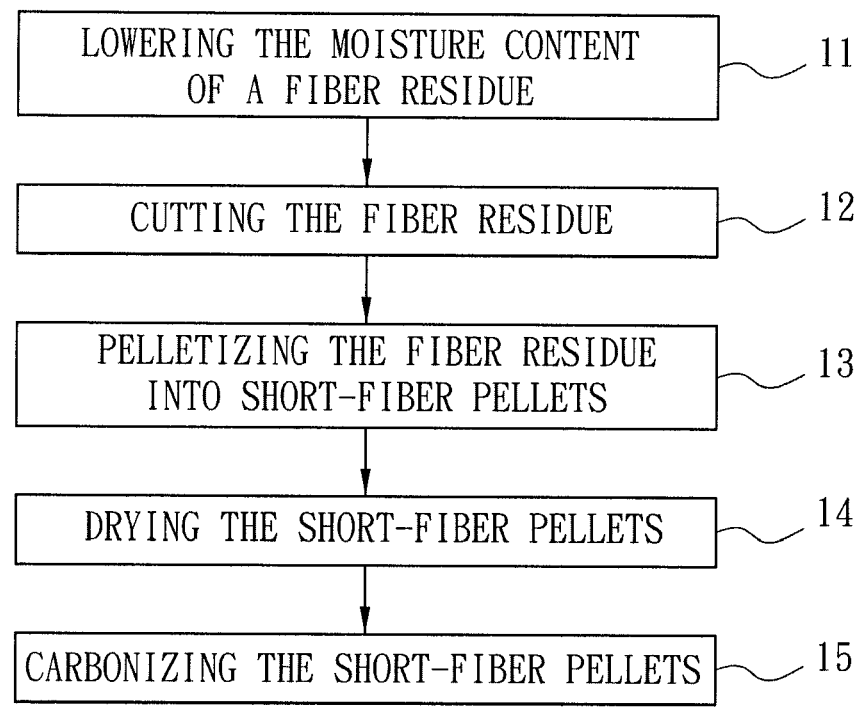

METHOD FOR PRODUCING A BIO-COAL

CROSS-REFERENCE TO RELATED APPLICATION

This application claims priority of Taiwanese Application No. 101103589, filed on Feb. 3, 2012.

BACKGROUND OF THE INVENTION

1. Field of the Invention

This invention relates to a method for producing a fuel coal, more particularly to a method for producing a bio-coal.

2. Description of the Related Art

Nowadays, large amounts of fuel coal are being consumed by power generation boilers in steel mills and certain large factories. However, combustion of fuel coal causes global warming owing to massive emission of greenhouse gases such as carbon dioxide. With the rising concerns over environmental issues, replacing fossil fuels with green energy and therefore reducing carbon dioxide emission has become an important topic.

A common type of green energy is biomass. Plants and cash crops, such as miscanthus, willow, millet, hemp, corn, sugarcane, palm tree, and the like, are transformed into fuels. The simplest way is, for example, direct combustion of the biomass to obtain thermal energy. Plants absorb and transform carbon dioxide into organic substances. The organic substances are released back to the atmosphere as carbon dioxide after the plants are oxidized (for example, combusted). Therefore, by using biomass as fuel, carbon dioxide content in the atmosphere can be balanced which is helpful for reducing the greenhouse effect. Moreover, this absorption and release of carbon oxide is a rather faster cycle. Also, the plants as fuel can be grown rapidly and repeatedly.

However, energy released during combustion of untreated plant fiber is less than energy released during combustion of fossil fuels. The energy contained in a substance is defined as calorific value which has a unit of energy per unit mass, such as cal/g. The untreated plant fiber also tends to rot after absorbing moisture in the atmosphere which makes it inconvenient to store and transport.

There remains a need for developing a technique for mass transformation of plant fiber into bio-coal.

Palm tree is a kind of high value cash crop being extensively planted in Southeast Asia where a large number of oil palms are grown. Fruits and kernels in the oil palms have rich oil content. Oil is extracted from the oil palms and then is processed into well-known palm oil. Fiber residue of extracted palm fruits is usually discarded or used as ash fertilizer after combustion, and thus has less utility value.

Therefore, this invention provides a method for producing a bio-coal from the widely available fiber reside of oil palm fruit. The bio-coal is able to satisfy the need for extensive fuel supplement in power generation boilers of large factories.

SUMMARY OF THE INVENTION

An object of this invention is to provide a method for producing a bio-coal which has high calorific value and is easy to preserve.

According to an aspect of this invention, there is provided a method for producing a bio-coal including the following steps:

(a) lowering the moisture content of a fiber residue obtained after oil extraction of oil palm fruit to less than 25%;

(b) after step (a), cutting the fiber residue;

(c) after step (b), pelletizing the fiber residue into short-fiber pellets;

(d) drying the short-fiber pellets to reduce the moisture content of the short-fiber pellets to below 10%; and (e) after step (d), carbonizing the short-fiber pellets at a temperature below 300° C.

BRIEF DESCRIPTION OF THE DRAWING

Other features and advantages of the present invention will become apparent in the following detailed description of the preferred embodiment with reference to the accompanying drawing, of which:

FIG. 1 is a flow chart of the preferred embodiment of a method for producing a bio-coal according to this invention.

DETAILED DESCRIPTION OF THE PREFERRED EMBODIMENT

FIG. 1 illustrates a method for producing a bio-coal of the preferred embodiment according to this invention. First, in step 11, the moisture content of a fiber residue obtained after oil extraction of oil palm fruit is lowered to less than 25%. The fiber residue after oil extraction of oil palm fruit has a moisture content above 40% which makes it hard to be cut into shorter fibers. Fiber residue of high moisture content also tends to spoil and makes it hard to preserve. However, fully drying the fiber residue requires higher energy consumption. Also, a certain amount of moisture is required in a following pelletizing step. Therefore, a moisture content of less than 25% is a preferable value based on process assessment and calculation.

After moisture lowering, the fiber residue is cut into a shorter fiber residue having an average length of 5 mm in step 12. It should be noted that most plant fibers, such as wood fiber, are long fibers which must be ground into powder before pelletizing. The oil palm fruit in this invention is a short fiber plant. Furthermore, the dried short fiber with moisture content less than 25% is fragile and can be directly cut into shorter fibers without using an energy-consuming grinding step.

After fiber residue cutting, the fiber residue is subjected to steam heating at a temperature ranging from 80° C. to 140° C. to adjust the moisture content of the fiber residue in a range between 15% to 30% in step 13. The fiber residue with 30% moisture content is then pelletized into short-fiber pellets using a ring die pelleting machine. The short-fiber pellets thus obtained have a moisture content between 17% to 20%, an average diameter ranging from 6 mm to 8 mm and an average length ranging from 10 mm to 20 mm. It is noted that, in the steam heating step, the controlled moisture and temperature are used to soften lignin of the fiber residue which serves as binder in the pelletizing step to bind the short fiber residue into short-fiber pellets.

The short-fiber pellets are then dried at, e.g., 150° C., to reduce the moisture content to below 10% in step 14. It is found that the moisture content of the short-fiber pellets before carbonization has great influence on calorific value of a final bio-coal product. Therefore, it is necessary to perform moisture control before conducting carbonization.

Finally, the short-fiber pellets with moisture content below 10% are carbonized at a temperature below 300° C. in step 15 to obtain the final product, i.e., the bio-coal, that has high calorific value and that is easy to preserve. The carbonization step is preferably conducted at a temperature ranging from 250° C. to 300° C., more preferably from 280° C. to 300° C., for 30 minutes. It is worthwhile to mention that the biomass raw material in this invention, namely oil palm fruit, is a short fiber plant which has a lignin content far less than woody plants. Unlike woody plants, the short-fiber pellets in this invention after high temperature carbonization are unable to produce a bio-coal with high calorific value and would suffer from lowered bio-coal yield. Hence, it is necessary to conduct the carbonization step at a temperature below 300° C. to obtain a bio-coal with high calorific value and high yield.

Table 1 illustrates components and calorific values of the fiber residue (i.e., the raw material of the bio-coal of this invention), the bio-coal produced by the method of this invention, and a conventional coal. It is evident that the bio-coal produced by the method according to this invention has a calorific value (5710 cal/g) similar to calorific value (5740 cal/g) of the conventional coal. The untreated fiber residue obtained after oil extraction of oil palm fruit only has a calorific value of 2460 cal/g. Therefore, the method for producing the bio-coal of this invention is able to transform the fiber residue of low calorific value to the bio-coal of high calorific value that is suited for use as fuel for power generation boilers.

TABLE 1

| | $H_2O$ (wt %) | VM (wt %) | Ash (wt %) | FC (wt %) | C (wt %) | H (wt %) | N (wt %) | S (wt %) | O (wt %) | CV (cal/g) | Yield (%) |
|---|---|---|---|---|---|---|---|---|---|---|---|
| Fiber Residue | 45 | 39.64 | 4.25 | 11.10 | 27.04 | 3.32 | 0.61 | 0.07 | 19.76 | 2460 | — |
| Bio-coal | — | 31.98 | 18.51 | 49.52 | 62.98 | 3.62 | 1.48 | 0.12 | 13.29 | 5710 | 48.0 |
| Conventional Coal | 13.92 | 44.09 | 1.52 | 40.46 | 63.72 | 4.40 | 0.67 | 0.10 | 15.66 | 5740 | — |

$H_2O$: water;
VM: volatile matter;
FC: fixed carbon;
C: carbon
H: hydrogen;
N: nitrogen;
S: sulfur;
O: oxygen;
CV: calorific value The method of this invention for producing the bio-coal has taken the entire process into consideration to lower the moisture content of the high moisture fiber residue to less than 25%, thereby reducing energy and water consumption. The short fiber oil palm fruit can be used with a cutting step to reduce fiber length instead of a conventional grinding step which consumes high power. Then, the fiber residue undergoes steam heating and pelletizing to transform into short-fiber pellets. Finally, the short-fiber pellets are carbonized at a relatively low temperature to form the bio-coal with high calorific value comparable to the calorific value of the conventional coal.

The bio-coal made by the method of this invention is less likely to rot and is easy to preserve and transport. Furthermore, oil palm is a high value cash crop which is massively grown for palm oil extraction. Therefore, sufficient and steady supply of oil palm fiber residue is available as raw material for producing the bio-coal.

While the present invention has been described in connection with what is considered the most practical and preferred embodiment, it is understood that this invention is not limited to the disclosed embodiment but is intended to cover various arrangements included within the spirit and scope of the broadest interpretation and equivalent arrangements.

What is claimed is:

1. A method for producing a bio-coal, comprising the following steps:
   (a) lowering the moisture content of a fiber residue obtained after oil extraction of oil palm fruit to less than 25%;
   (b) after step (a), cutting the fiber residue;
   (c) after step (b), pelletizing the fiber residue into short-fiber pellets;
   (d) drying the short-fiber pellets to reduce the moisture content of the short-fiber pellets to below 10%; and
   (e) after step (d), carbonizing the short-fiber pellets at a temperature below 300° C.;
   wherein, after step (b) and before step (c), the fiber residue is subjected to steam heating at a temperature ranging from 80° C. to 140° C. to adjust the moisture content of the fiber residue to a range between 15% and 30%.

2. The method of claim 1, wherein, in step (b), the fiber residue is cut to have a length less than 5 mm.

3. The method of claim 1, wherein the short-fiber pellets obtained in step (c) have a moisture content ranging from 17% to 20% and have an average diameter ranging from 6 mm to 8 mm and an average length ranging from 10 mm to 20 mm.

4. The method of claim 1, wherein step (d) is conducted at a temperature below 150° C.

5. The method of claim 1, wherein step (e) is conducted at a temperature ranging from 250° C. to 300° C. for 30 minutes.

* * * * *